United States Patent [19]

Choi et al.

[11] Patent Number: 4,584,241

[45] Date of Patent: Apr. 22, 1986

[54] STABILIZATION OF PVC BODIES

[75] Inventors: Jae H. Choi, Indianapolis; Larry E. Fortner, Beech Grove, both of Ind.; John J. Mottine, Jr., West Keansburg, N.J.; William C. Vesperman, Bel Air, Md.

[73] Assignees: AT&T Technologies, Berkeley Heights; AT&T Bell Laboratories, Murray Hill, both of N.J.

[21] Appl. No.: 597,130

[22] Filed: Apr. 6, 1984

[51] Int. Cl.⁴ ............................ B32B 15/00; H01B 7/00; H01B 7/01
[52] U.S. Cl. ........................... 428/379; 428/378; 428/375; 174/110 V; 174/120 SR; 524/313; 524/567; 524/569
[58] Field of Search ................ 428/375, 379, 378; 524/313, 567, 569; 174/110 SR, 110 V, 120 SR

[56] References Cited

U.S. PATENT DOCUMENTS 2,486,182 10/1949 Lawrence ..................... 524/313
4,338,226 7/1982 Worschech et al. ............. 524/569

FOREIGN PATENT DOCUMENTS

| 248855 | 8/1963 | Australia | 524/313 |
| 142586 | 11/1979 | Japan | 174/110 V |
| 15082 | 4/1981 | Japan | 174/110 V |
| 2034331 | 6/1980 | United Kingdom | 524/313 |

Primary Examiner—George F. Lesmes
Assistant Examiner—Beverly Johnson
Attorney, Agent, or Firm—Bruce S. Schneider

[57] ABSTRACT

The epoxy resin stabilizing systems in combination with cadmium containing stabilizers employed in PVC compounds are replaceable without affecting other properties of the polymer by utilizing a specific additive mixture. In particular, a complex ester of oleic acid and a diglycerol ester of oleic acid are employed in conjunction with a calcium-zinc composition. The resulting system yields excellent processing and long-term stability without significantly affecting other properties such as color stability and flame retardancy.

6 Claims, 1 Drawing Figure

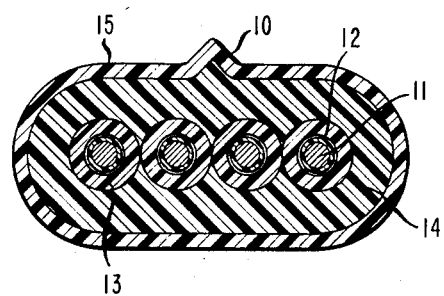

STABILIZATION OF PVC BODIES

BACKGROUND OF THE INVENTION

1. Field of the Invention

This invention relates to polymer bodies and, in particular, polymer bodies that include additives.

2. Art Background

Poly(vinyl chloride) (PVC) is used in an extremely large variety of applications. However, PVC itself is unstable to heat and light. To mitigate this problem, PVC is mixed with a carefully formulated stabilizer system. Unless this system is very carefully formulated, PVC exhibits processing and stability difficulties. The heat utilized to mold the polymer into a desired shape is sometimes sufficient to cause its decomposition. Additionally, stabilized PVC still has a tendency to undergo decomposition. The stability of PVC has been significantly improved by adding a variety of stabilizers. For example, it is common to utilize epoxy resins together with a barium-cadmium (Ba/Cd) phosphite or barium-cadmium-zinc (Ba/Cd/Zn) phosphite mixture to control both processing and long-term stability. Stabilizers have proven to be quite effective and are used in essentially all PVC products. Recently, however, there has been some desire to replace the epoxy resin and also cadmium-containing stabilizer system with another system.

Long-term and processing stability, however, are not the only properties which must be controlled for effective use of PVC compound. Typically, it is desirable that additives be introduced into the PVC to modify other characteristics. For example, it is desirable that the PVC compound be flame retardant, be amenable to expeditious processing, be stable in humid conditions, have heat and color stability over time, and have desirable mechanical and electrical properties. Thus, polymers such as PVC must be blended with not only stabilizers but with many additives to produce all of the desired properties. Generally, each additional additive substantially augments the price of the blended polymer. One additive often enhances one property but either degrades a second property or degrades the efficacy of other additives. For example, attempts to replace epoxy resin and cadmium systems have not been successful. Substitutes for epoxy resins yield significantly degraded stability, and substitutes for cadmium such as lead and tin stabilizers often have toxicity, color, and cost disadvantages. The predisposition of additives to separate from the polymer and coat the processing equipment is also increased as the number and amount of additives are increased. It is, therefore, extremely difficult to formulate a suitable additive system or to modify an existing additive system.

As discussed, it is quite difficult to remove and replace epoxy stabilizers. Additionally, replacement additives, even if they could be formulated, are quite likely to affect adversely other properties and to interact undesirably with other additives. As a result, an effective substitute for epoxy stabilizing systems that produce adequate stability without adversely affecting other desirable properties has not been reported.

SUMMARY OF THE INVENTION

Epoxy resin systems, for example, those including cadmium containing stabilizers for PVC stabilization, have been effectively replaced with a mixture of oleic acid based esters in conjunction with a calcium-zinc composition. These oleic acid esters yield excellent properties and additionally are compatible with other additives typically employed in PVC formulations. This substitute for epoxy resins includes a mixture of a complex ester of oleic acid (i.e., an oleic acid ester having branched chains) with a diglycerol ester of oleic acid. The oleic acid based mixture is then utilized with a calcium-zinc composition, for example, a calcium-zinc stearate.

The combination of the oleic acid esters with the calcium-zinc composition produces excellent processing and long-term stability without affecting other properties such as heat and color stability, exudation, plate-out, and mechanical integrity. The material is easily blended by conventional techniques with the PVC polymer and essentially does not exude from the polymer either during or after processing.

BRIEF DESCRIPTION OF THE DRAWING

The FIGURE is illustrative of one embodiment of the subject invention.

DETAILED DESCRIPTION

As discussed, to obtain the advantageous properties of processing and long-term stability while maintaining the other desirable attributes of a PVC polymer afforded by an appropriate additive system, a specific stabilizer composition is utilized. This stabilizer composition includes not only a calcium-zinc composition but also the combination of a complex ester of oleic acid with a diglycerol ester of oleic acid.

A complex ester of oleic acid, for purposes of this disclosure, is an ester that could be formed by the hypothetical reaction of oleic acid with a branched chained alcohol. (This definition does not preclude complex esters formed by a reaction other than alcohol-acid condensation or which cannot be formed by such reaction provided the ester can be postulated as the product of such a condensation.) Typical advantageous complex esters of oleic acid contain 28 to 32 carbon atoms. (Combinations of complex oleic acid esters are also useful.) For example, a pentaerythritol-adipate-oleate, e.g., Loxiol G-71 manufactured by Henkel, Inc., is quite useful. The complex ester of oleic acid should be utilized in a weight percentage of from 0.05 to 0.2 percent of the PVC compound including additives which are equivalent to 0.1 to 0.3 parts by weight per 100 parts of PVC resin. (Polymer and resin are used synonymously for purposes of this disclosure.) Preferably, the complex ester of oleic acid is utilized in a weight percentage 0.08 to 0.12 of the total weight of the PVC polymer with its associated additives. If less than 0.05 percent is utilized, an excessive shear heat causes degradation of the PVC polymer. Typically, if greater than 0.2 percent of complex ester is utilized, excessive slippage in the processing of the polymer results. Slippage, in turn, yields surging of the polymer through the processing equipment and irregularities in the product due to polymer flow instability. Additionally, for percentages higher than 0.2, the additives tend to plate-out from the PVC formulation onto the surfaces of the processing equipment. After this occurrence, the composition of the remaining polymer material is significantly different from that desired and thus adversely affects the appearance and physical characteristics of the finished product.

The diglycerol ester or combination of esters of oleic acid used in conjunction with the complex ester(s) of oleic acid (Loxiol G-71) is preferably an ester having 14 to 18 carbon atoms, e.g., Loxiol G-16 manufactured by Henkel, Inc. The diglycerol ester, i.e., an ester of 2-3,bishydroxymethylbutane-1-2-3-4-tetrol, is advantageously utilized in a weight percentage to total weight of the PVC compound of from 0.1 to 0.5 percent by weight, which is equivalent to 0.2 to 1.0 parts by weight per 100 parts of PVC resin. A weight percentage of less than 0.1 percent results in a lack of compatibility (plate-out during processing) of the oleic acid ester system with other additives and causes additive exudation. Weight percentages below 0.1 percent also lead to heat buildup in the PVC compound during processing with the associated degradation of the PVC polymer. Weight percentages greater than 0.5 percent retard mixing and incorporation of the PVC polymer with its additives and causes excessive slippage resulting in polymer flow instability during processing. Additionally, levels higher than 0.5 percent generally lead to plate-out during processing and exudation of either the oleic acid ester compounds or of other additives present in the system.

The oleic acid esters should be used with a calcium-zinc stabilizer. These calcium-zinc stabilizers are described by Marcel Dekker, *Encyclopedia of PVC*, 1, edited by L. I. Nass (1976), pages 311-313, and are typically in the form of the calcium-zinc stearate, although other salts such as those formed from benzoates, carboxylates, and carboxylic acids are useful. The important considerations in formulating the calcium-zinc mixture are (1) the ratio between the calcium and zinc and (2) the percentage of calcium and zinc relative to the total weight of the PVC compound. Typically, it is desirable for the total weight percent of calcium and zinc in the calcium-zinc mixture relative to the entire PVC compound (including additives) to be between 0.8 and 3 percent by weight which is equivalent to 1.7 and 6.5 parts by weight per 100 parts of PVC resin. Weight percentages larger than 3 percent generally cause plate-out of additives onto the extruder surfaces. For weight percentages less than 0.8 percent, the PVC polymer becomes dynamically unstable. That is, the PVC polymer upon processing undergoes degradation. (Typically, the heat stability should be greater than 15 minutes using a Plasti-Corder Brabender torque rheometer at 100 rpm rotor speed and 205 degrees C. bowl temperature.) The weight ratio between the calcium and the zinc present in the PVC compound should be in the range 1:1 to 1:4.5. Ratios lower than 1:1 cause poor dynamic heat stability and color stability while ratios higher than 1:4.5 cause plate-out. Exemplary of a suitable calcium-zinc system is Therm-Chek 9164W, manufactured by the Ferro Chemical Company, which is a calcium-zinc stearate blend having a ratio between calcium and zinc of 1:1.03.

The PVC polymers useful in this invention include not only homopolymers of vinyl chloride but also include copolymers containing up to 20 percent, preferably up to 10 percent, by weight of comonomers such as propylene and/or copolymers such as poly(vinyl acetate). Where the PVC compound is to be used in electrical insulation applications, it is desirable in general that it have certain electrical characteristics. For typical applications, a PVC compound is chosen which falls within the GP4-00005 to GP7-00005 (inclusive) classification promulgated in A.S.T.M. Standard for 1966 and found in the A.S.T.M. Standard under the designation D1755-66.

As discussed, the combination of the calcium-zinc mixture with the oleic acid composition is sufficient to yield the desired stability results. As further discussed, the stabilizer system of the invention is, however, also compatible with a wide range of other additives typically employed with PVC based compounds. For example, a plasticizer such as monomeric phthalate plasticizer is generally employed in PVC compositions in a weight concentration of from 35 to 55 parts per 100 parts of PVC resin to achieve a low temperature brittleness that satisfies the test specified in A.S.T.M. D746. For example, a di(N-octyl-n-decyl)phthalate, di(N-hexyl-n-decyl)phthalate, di-2-ethylhexyl phthalate, a di-isodecyl phthalate, a di-iso-octyl phthalate, a di-iso-nonyl phthalate, a di-tridecyl phthalate, an iso-decyl-tridecyl phthalate, an iso-decyl-tridecyl phthalate, or a di-undecyl phthalate is employable.

For some applications, it is also desirable that the final PVC composition be oil resistant so that in applications involving oil contact, e.g., the handling by human beings, exudation does not occur. This is accomplished with commercially available additives such as Santizier 429 (available from the Monsanto Chemical Company). Such additives are generally added in a ratio of 12:20 parts by weight per 100 parts of PVC resin. If less than 12 parts are used, the composition typically has degraded oil resistance and if more than 20 parts are used, the PVC compound is excessively softened. Other exemplary additives are solid terpolymer plasticizers such as described in U.S. Pat. No. 3,780,140, issued Dec. 18, 1973 (which is hereby incorporated by reference). Such plasticizers are typically utilized in a concentration of from 5 to 10 parts per 100 parts of PVC resin. Flame retardancy is also enhanced through the use of additives such as antimony trioxide, which is generally employed in a concentration of from 2 to 5 parts per 100 parts by weight of PVC resin. Fillers such as silicon-coated calcium carbonate are also employable in concentrations up to 50 parts per 100 parts by weight of the PVC resin.

Other fillers such as fumed silica are employable and are typically utilized in concentrations of 0.5 to 2 parts per 100 parts by weight of PVC resin. The use of stabilizers in addition to the oleates previously described is also possible. For example, alkyl aryl phosphites in a weight percentage of from approximately 0.17 to 0.67 parts per 100 parts by weight of PVC resin are compatible with the oleic acid esters previously described.

In one embodiment of the invention, an electrical cable such as shown in the FIGURE is produced. In this configuration, the conductor, 11, is surrounded by an air space, 12, and by an insulation material, 13, which is typically flammable, e.g., a polyether ester copolymer such as described in U.S. Pat. No. 4,090,763, issued May 23, 1978 (which is hereby incorporated by reference) or a rubber blend polymer. The PVC compound, 14, is then coated around the insulated conductors by conventional techniques and then, in turn, is coated also by conventional techniques with a protective layer, 15. This protective coating is generally a polyester copolymer such as described in U.S. Pat. No. 4,166,881, issued Apr. 8, 1979 (which is hereby incorporated by reference).

A variety of samples was prepared, as shown in the following examples, to demonstrate the effect of the presence of calcium zinc and also to demonstrate the effect of the oleic acid esters.

EXAMPLE 1

All the solid components of the PVC based material were mixed in one vessel, and the liquid components were mixed in a second vessel. The solid components included 100 grams of PVC resin, 7 grams of a terpolymer denominated Elvaloy 741, 3 grams of antimony trioxide, 40 grams of calcium carbonate, and 1.3 grams of fused silica, while the liquid components included 43 grams of monomeric phthalate plasticizer, 16 grams of polymeric plasticizer, and 1 gram of phosphite. The liquid components also included (1) the indicated amount of calcium-zinc composition in the form of stearates, as shown in Table 1 and Table 2 for each sample, (2) the complex esters of oleic acid as designated by Loxiol G-71 which is a trade name of Henkel, Inc., and 3) oleic acid diglycerol esters as designated Loxiol G-16 which is a trade name of Henkel, Inc. in the amounts for each sample shown in the Tables.

The liquid components and the solids were each individually stirred and then the liquids were added to the solids with agitation to produce a material with a pasty consistency. The resulting paste was processed into a fused-plastic cake by treating it with a dynamic intensive mixer manufactured by the Stewart Bolling Corporation. This mixer produced the transformation from paste to cake by internal dynamic mixing. Each cake sample was then converted into a sheet by passing it through a 2-roll mill. The rollers were adjusted to produce a sheet having a thickness of approximately 100 mils. Each sheet was shredded into cubic pellets approximately a quarter-inch on edge.

Each sample consisting of a plurality of pellets and having the amounts of calcium-zinc and oleic acid esters as designated in Tables 1 and 2 was tested for adhesion, plate-out, heat stability, and in the case of the samples of Table 1, for flow stability. These tests were based on the extrusion performance observed by processing each sample. In particular, the sample was processed in a Plasti-Corder Brabender torque rheometer at 100 rpm rotor speed with a 205 degrees C. bowl temperature. Heat stability was based on dehydrochlorination of the PVC polymer as a result of degradation as evidenced by abrupt increase in viscosity of the PVC compound. A minimum heat stability should be greater than 15 minutes.

The extrusion performance of each sample was also determined by extruding each sample in a 2-inch extruder at a rate of 400 feet per minute by using for a period of 24 hours an extruder temperature profile in the four zones of the extruder of 330, 340, 350, 360 degrees F., respectively. Flow stability was evaluated on the basis of the uniformity and reproducibility of the extruded product where uniformities and reproducibilities greater than 0.180 inch (outside diameter) and less than 0.195 inch (outside diameter), respectively, are desirable. Plate-out performance was evaluated by removing the extruder screw after the 24-hour treatment period and measuring the amount of deposited material. A level which does not require a mechanical brushing was considered good. Similarly, a desirable level of adhesion to the tooling was determined by extrudability of the product without size fluctuations greater than 0.180 inch (outside diameter) and less than 0.195 inch (outside diameter).

TABLE I

| Percent by Weight | | | | | |
|---|---|---|---|---|---|
| Therm-Chek 9164W Ca/Zn (1/1.03) | Loxiol G-71 | Loxiol G-16 | Plate-Out | Heat Stability | Flow Stability |
| 0.8 | 0.05 | 0.1 | acceptable | acceptable | acceptable |
| 1.4 | 0.09 | 0.37 | acceptable | acceptable | acceptable |
| 3.0 | 0.2 | 0.5 | acceptable | acceptable | acceptable |
| 0.8 | 0.3 | 0.6 | high | acceptable | L.S.* |
| 0.8 | 0.02 | 0.05 | high | low | acceptable |
| 0.6 | 0.05 | 0.1 | acceptable | low | acceptable |
| 3.0 | 0.02 | 0.05 | high | low | acceptable |
| 4.0 | 0.05 | 0.1 | high | acceptable | acceptable |
| 4.0 | 0.02 | 0.05 | high | low | acceptable |
| 1.4 | 0.3 | 0.1 | high | acceptable | L.S. |
| 1.4 | 0.05 | 0.8 | high | acceptable | L.S. |

*L.S. = Less stable

TABLE II

| Ca/Zn Ratio | Percent by Weight Ca/Zn | Loxial G-71 | Loxial G-16 | Polymer Flow Stability | Plate-Out | Heat Stability |
|---|---|---|---|---|---|---|
| 1/1.03 | 1.4 | 0.09 | 0.37 | accept* | accept | accept |
| 1/0.5 | 1.4 | 0.09 | 0.37 | accept | accept | low |
| 1/7.0 | 1.4 | 0.09 | 0.37 | accept | high | accept |
| 1/0.5 | 0.6 | 0.09 | 0.37 | accept | accept | low |
| 1/0.5 | 4.0 | 0.09 | 0.37 | accept | high | low |

*accept = acceptable

What is claimed is:

1. A cable comprising an electrical conductor and a body of poly(vinyl chloride) based material wherein said body surrounds at least a portion of said electrical conductor, said body comprising a poly(vinyl chloride) based polymer, a calcium-zinc stabilizer, a complex ester of oleic acid with a branched chain alcohol, and a diglycerol ester of oleic acid wherein said complex ester is present in a weight percentage of from 0.05 to 0.2 of said polymer, and said diglycerol ester of oleic acid is present in a weight percentage of from 0.1 to 0.5 of said polymer.

2. The cable of claim 1 wherein the total weight percentage of calcium and zinc present is from 0.8 to 3 weight percent of said polymer.

3. The cable of claim 2 wherein said calcium-zinc composition comprises calcium stearate and zinc stearate.

4. The cable of claim 1 wherein said calcium-zinc composition comprises calcium stearate and zinc stearate.

5. The cable of claim 1 wherein said complex ester comprises a pentaerythritol-adipate-oleate.

6. The cable of claim 1 wherein said diglycerol ester comprises an oleic acid ester of 2-3,bishydroxymethyl-butane-1-2-3-4-tetrol.

* * * * *